(12) United States Patent
Kapinos et al.

(10) Patent No.: US 10,354,573 B2
(45) Date of Patent: Jul. 16, 2019

(54) SCREEN COLOR CALIBRATION

(71) Applicant: LENOVO (Singapore) PTE. LTD., New Tech Park (SG)

(72) Inventors: Robert James Kapinos, Durham, NC (US); Timothy Winthrop Kingsbury, Cary, NC (US); Scott Wentao Li, Cary, NC (US); Russell Speight VanBlon, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 15/659,324

(22) Filed: Jul. 25, 2017

(65) Prior Publication Data

US 2019/0035319 A1 Jan. 31, 2019

(51) Int. Cl.
*G09G 3/20* (2006.01)
*G09G 5/02* (2006.01)
*G09G 3/34* (2006.01)
*G06F 1/16* (2006.01)
*G09G 3/36* (2006.01)

(52) U.S. Cl.
CPC ......... *G09G 3/2003* (2013.01); *G09G 3/3413* (2013.01); *G09G 5/02* (2013.01); *G06F 1/1616* (2013.01); *G09G 3/3696* (2013.01); *G09G 2320/0646* (2013.01); *G09G 2320/0693* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 8,791,999 B2* | 7/2014 | Marcu | ........... | G01B 11/022 |
| | | | | 348/135 |
| 8,878,786 B2* | 11/2014 | Imai | ........... | G06T 11/001 |
| | | | | 345/158 |
| 9,560,242 B2* | 1/2017 | Hill | ........... | G01J 3/46 |
| 2004/0125447 A1* | 7/2004 | Sato | ........... | G02B 27/22 |
| | | | | 359/462 |
| 2005/0190181 A1* | 9/2005 | Sakagawa | ........... | G06T 15/60 |
| | | | | 345/419 |
| 2007/0024618 A1* | 2/2007 | Ajito | ........... | G03B 15/06 |
| | | | | 345/426 |
| 2007/0236510 A1* | 10/2007 | Kakuta | ........... | G06T 11/00 |
| | | | | 345/632 |
| 2010/0066837 A1* | 3/2010 | Kwong | ........... | H04N 9/73 |
| | | | | 348/180 |
| 2012/0075484 A1* | 3/2012 | Kawamoto | ........... | G06T 19/006 |
| | | | | 348/207.1 |
| 2012/0188367 A1* | 7/2012 | Marcu | ........... | G01B 11/022 |
| | | | | 348/135 |
| 2013/0162637 A1* | 6/2013 | Son | ........... | G03H 1/08 |
| | | | | 345/419 |
| 2014/0063039 A1* | 3/2014 | Drzaic | ........... | G09G 5/02 |
| | | | | 345/589 |

(Continued)

*Primary Examiner* — Martin Mushambo
(74) *Attorney, Agent, or Firm* — Kunzler Bean & Adamson

(57) ABSTRACT

For screen color calibration is disclosed, a camera is disposed in a bezel of a computer. A mirror reflects light from a screen of the computer to the camera. A target is visible by the camera. A processor compares an image of the mirror and an image of the target captured by the camera. The processor further calibrates the screen color of the screen to match the target.

17 Claims, 9 Drawing Sheets

(56) References Cited

U.S. PATENT DOCUMENTS

| | | | | |
|---|---|---|---|---|
| 2015/0123991 A1* | 5/2015 | Yarosh | G02B 27/017 | |
| | | | 345/629 | |
| 2015/0213573 A1* | 7/2015 | Mukawa | G02B 27/017 | |
| | | | 345/522 | |
| 2015/0242998 A1* | 8/2015 | Kitazawa | G06K 9/00375 | |
| | | | 345/419 | |
| 2015/0248775 A1* | 9/2015 | Freeman | G06T 11/001 | |
| | | | 345/589 | |
| 2015/0248785 A1* | 9/2015 | Holmquist | G06T 19/006 | |
| | | | 345/419 | |
| 2016/0360167 A1* | 12/2016 | Mitchell | H04N 9/3194 | |
| 2017/0206691 A1* | 7/2017 | Harrises | G06T 11/60 | |
| 2017/0208292 A1* | 7/2017 | Smits | H04N 13/243 | |
| 2017/0243406 A1* | 8/2017 | Yamazaki | G09G 3/002 | |
| 2018/0126241 A1* | 5/2018 | Hung | A63B 69/004 | |

* cited by examiner

SCREEN COLOR CALIBRATION

FIELD

The subject matter disclosed herein relates to screen color calibration.

BACKGROUND

The colors displayed by a screen may drift from true colors over time.

BRIEF SUMMARY

An apparatus for screen color calibration is disclosed. The apparatus includes a camera, a mirror, a target, a processor, and a memory. The camera is disposed in a bezel of a computer. The mirror reflects light from a screen of the computer to the camera. The target is visible by the camera. The memory stores code executable by the processor to compare an image of the mirror and an image of the target captured by the camera. The processor further calibrates the screen color of the screen to match the target. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
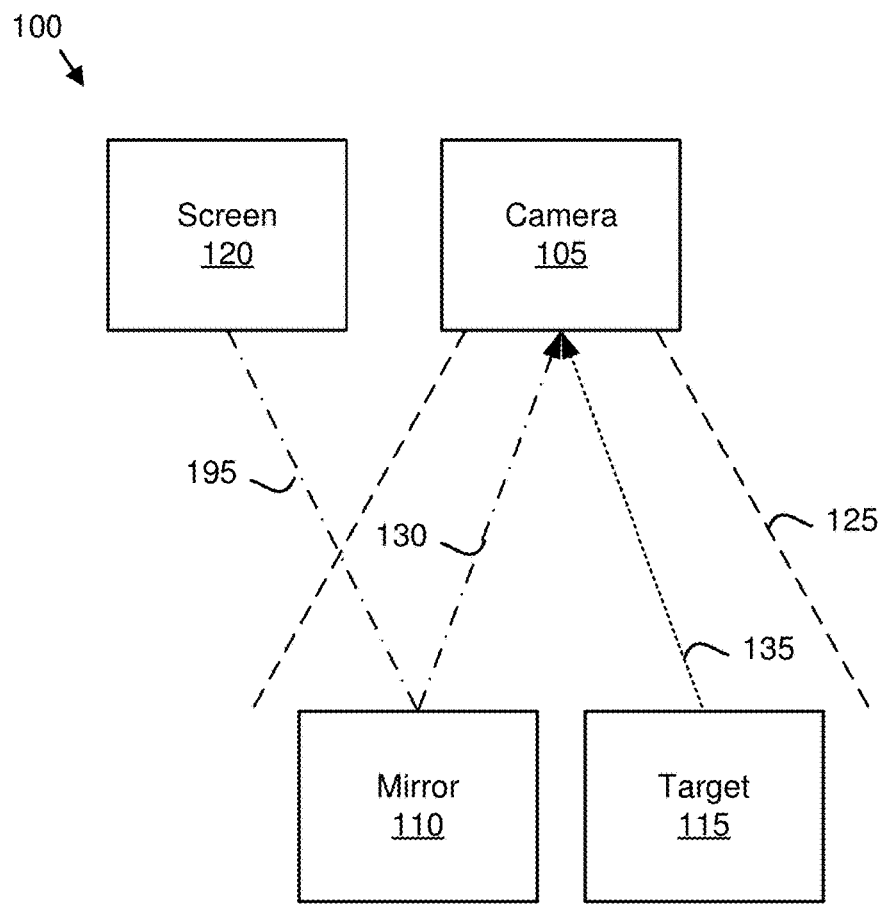
FIG. 1A is a schematic block diagram illustrating one embodiment of a color calibration apparatus.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a color calibration apparatus 100. The apparatus 100 calibrates screen color for a screen 120. In the depicted embodiment, the apparatus 100 includes the screen 120, a camera 105, a mirror 110, and a target 115. The screen 120 may be coupled to a computer. The target 115 may exhibit a target color that is desired for the screen 120.

The screen 120 may display color images. Over time, the screen color of the screen 120 may drift from displaying desired colors. The embodiments described herein calibrate the screen color for the screen 120 so the screen 120 consistently displays the desired colors over time.

The mirror 110 may reflect light 195 from the screen 120 to the camera 105. The mirror 110 is within a field of view 125 of the camera 105. The camera 105 captures an image of the mirror 130 which includes the light 195 from the screen 120. The camera 105 also captures an image of the target 135. The embodiments may compare the image of the mirror 130 and the image of the target 135 and calibrate the screen color of the screen 120 to match the target 115 as will be described hereafter.

Figure 1B:
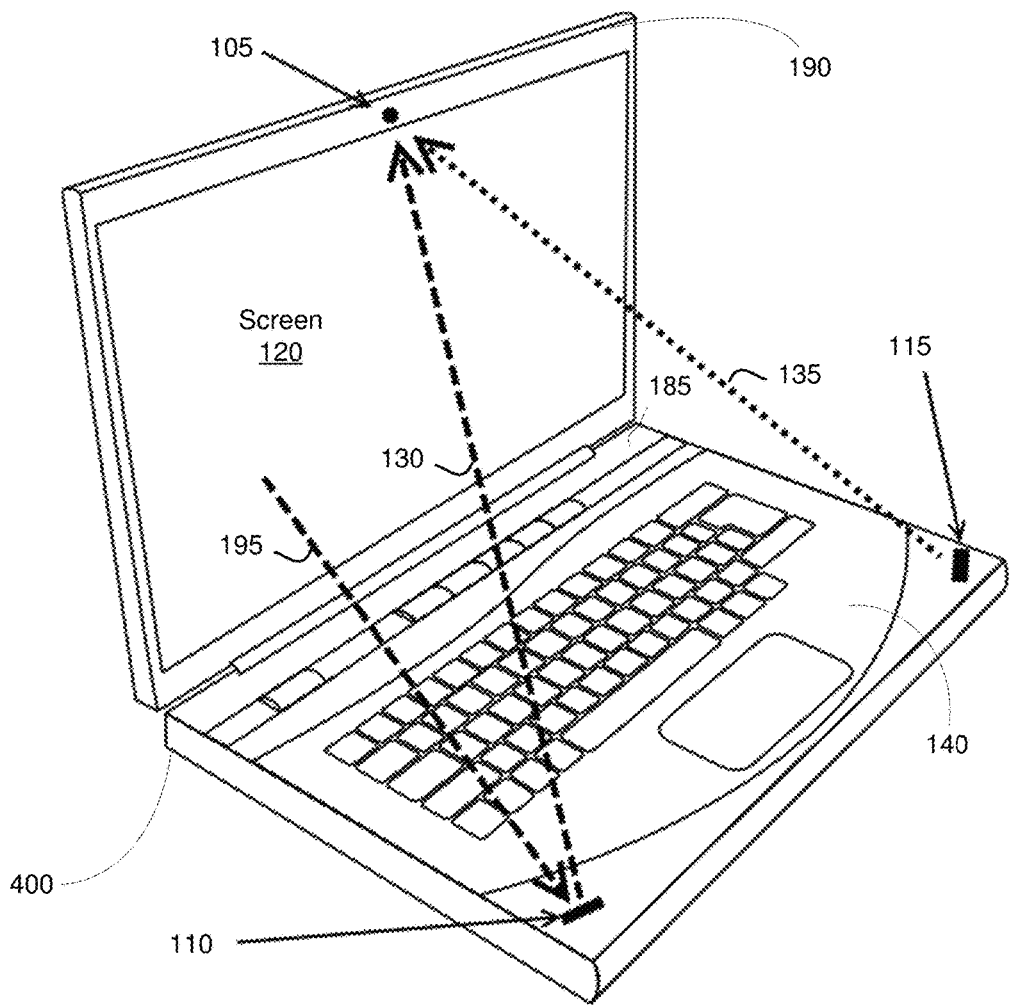
FIG. 1B is a perspective drawing illustrating one embodiment of a laptop computer with color calibration.

FIG. 1B is a perspective drawing illustrating one embodiment of a laptop computer 400 with color calibration. In the depicted embodiment, the mirror 110 and the target 115 are disposed in a base 140 of the computer 400. Alternatively, the target 115 and/or the mirror 110 may be disposed in the bezel 190. In addition, the target 115 and/or the mirror 110 may be disposed beside the screen 185. The camera 105 is depicted at a top of the bezel 190. However, the camera 105 may also be located at a bottom of the bezel 190, a side of the bezel 190, or any corner of the bezel 190.

Figure 1C:
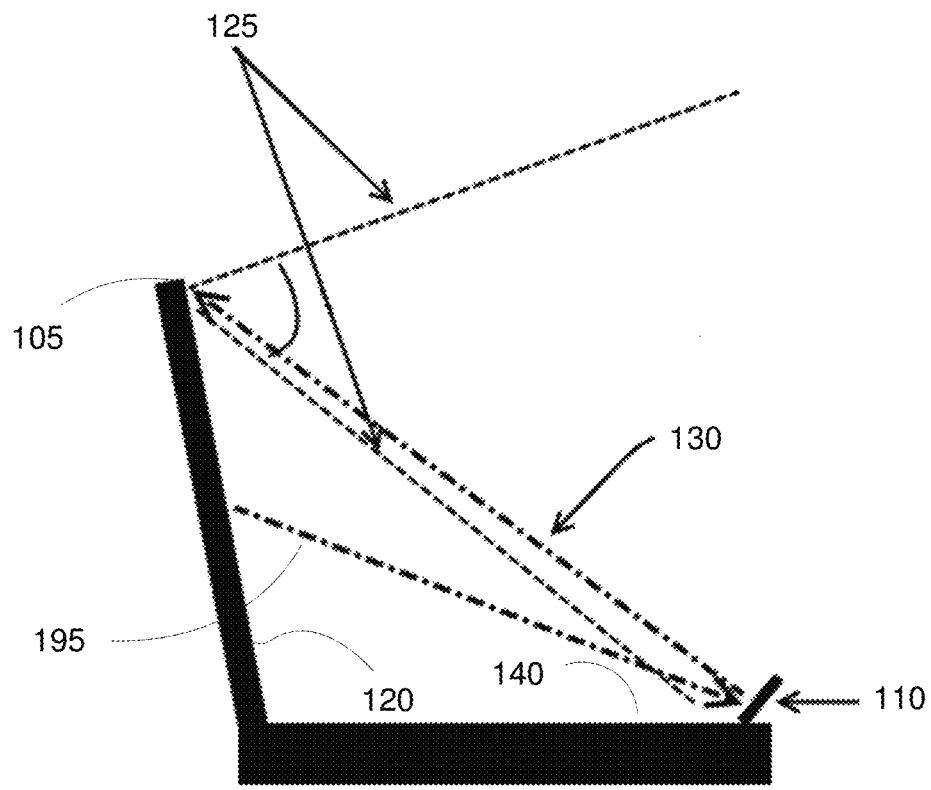
FIG. 1C is a side view drawing illustrating one embodiment of color calibration for a laptop computer.

FIG. 1C is a side view drawing illustrating one embodiment of color calibration for a laptop computer 400. The field-of-view 125 for the camera 105 is shown. The light 195 from the screen 120 is reflected by the mirror 110 as an image of the mirror 130 that is received by the camera 105.

Figure 1D:
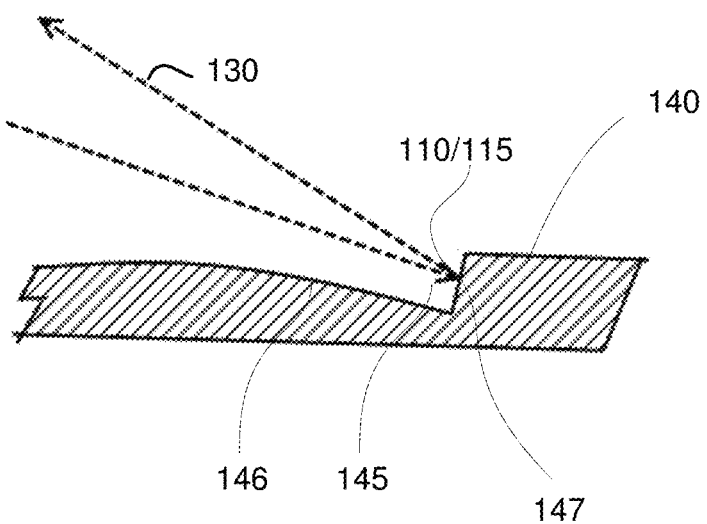
FIG. 1D is a side view drawing illustrating one embodiment of a divot for a target and a mirror.

FIG. 1D is a side view drawing illustrating one embodiment of a divot 145 for the target 115 and/or the mirror 110. The divot 145 may be a depression and/or indentation in the base 140. In the depicted embodiment, the divot 145 includes a slope 146 and a wall 147. The target 115 and/or the mirror 110 may be disposed on the wall 147 of the divot 145.

Figure 2A:
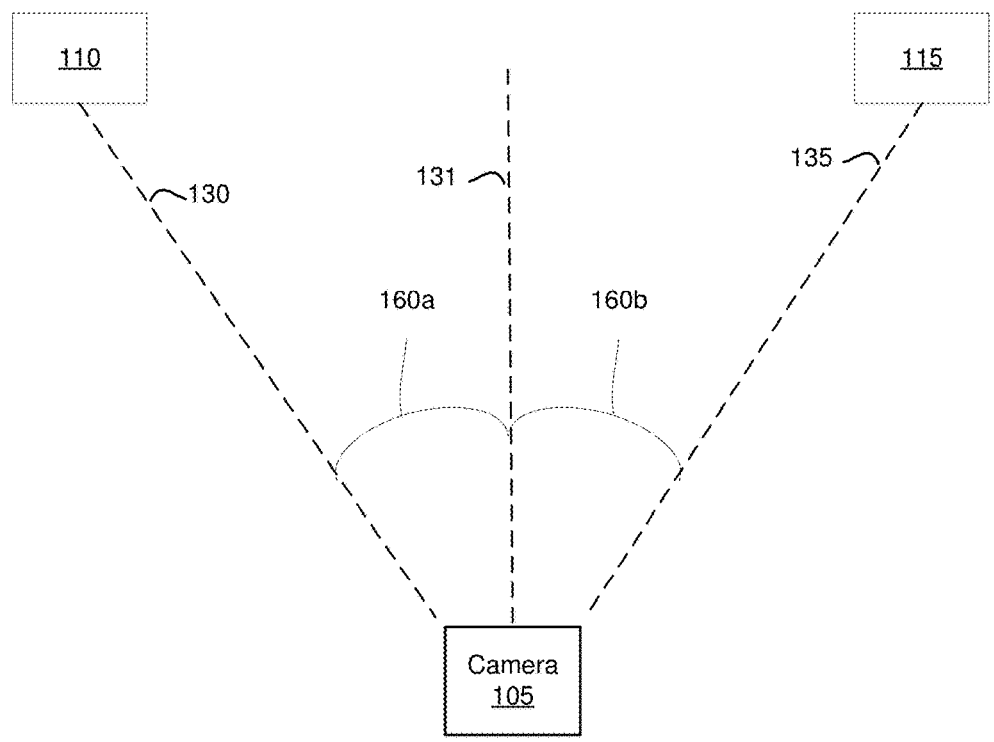
FIG. 2A is a schematic diagram illustrating one embodiment of optical angles.

FIG. 2A is a schematic diagram illustrating one embodiment of optical angles. In the depicted embodiment, the mirror 110 is separated from the target 115. The optical angle 160a from the image of the mirror 130 to a center axis 131 of the camera 105 is substantially equivalent to the optical angle 160b from the image of the target 135 to the center axis 131. As used herein, substantially equivalent is within 5 degrees.

Figure 2B:
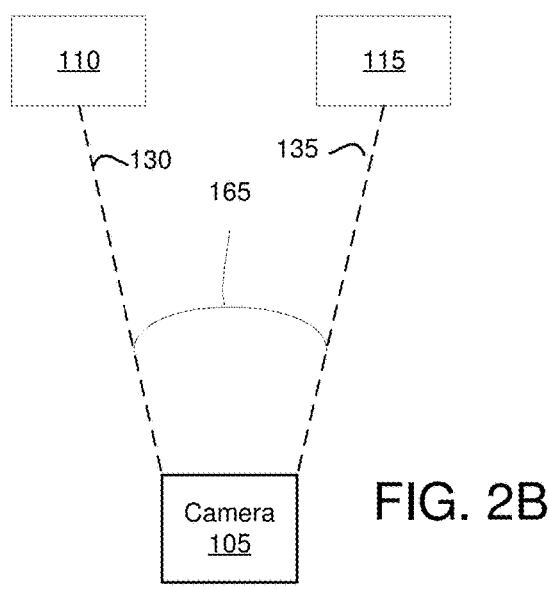
FIG. 2B is a schematic diagram illustrating one alternate embodiment of optical angles.

FIG. 2B is a schematic diagram illustrating one alternate embodiment of optical angles. In the depicted embodiment, the optical angle 165 between the image of the mirror 130 in the image of the target 135 is shown. The image of the mirror 130 and the image of the target 135 may be located along substantially proximate vectors. The optical angle 165 may be within an angular threshold. The angular threshold may be in the range of 5 to 15°.

Figure 3:
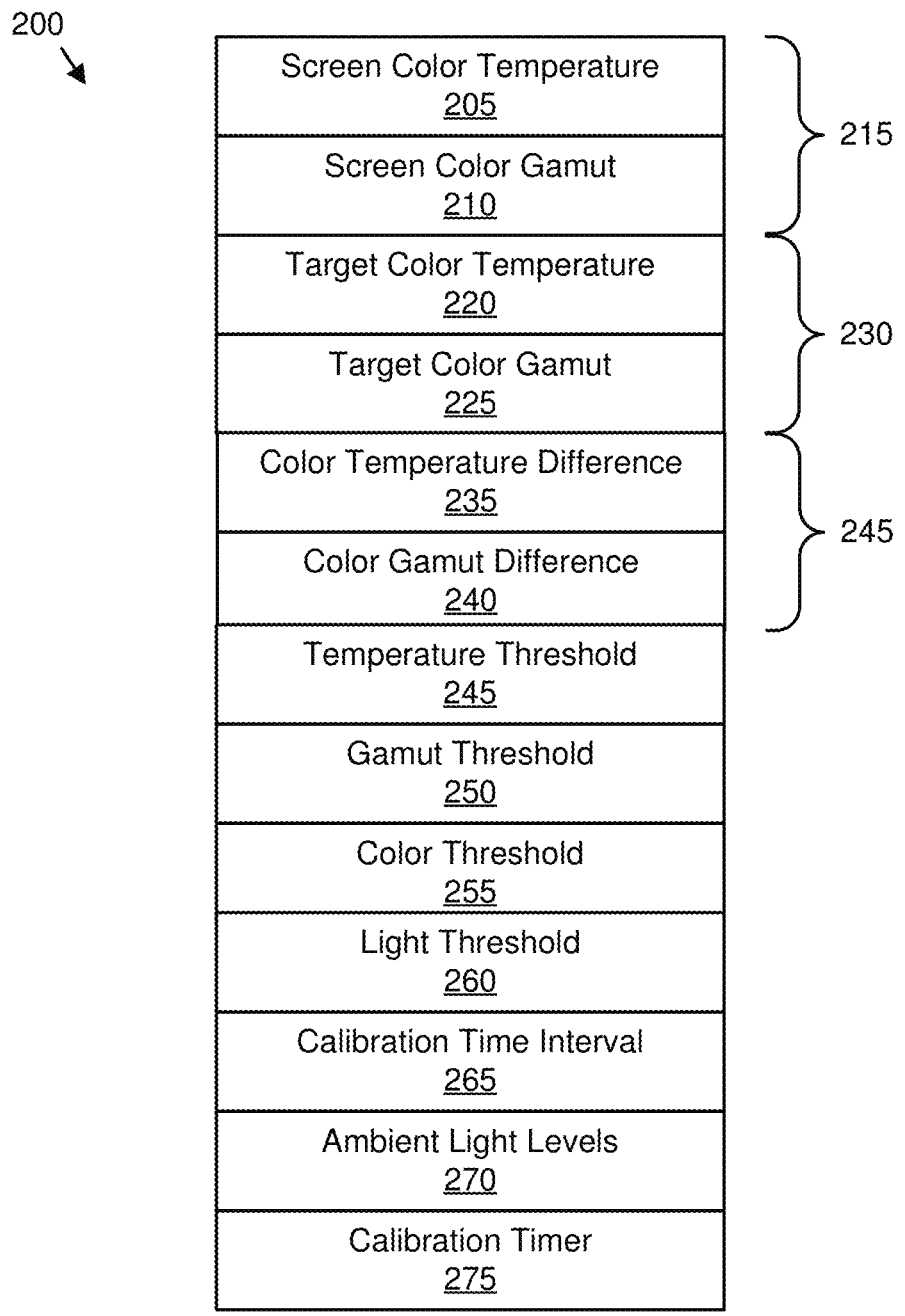
FIG. 3 is a schematic block diagram illustrating one embodiment of color data.

FIG. 3 is a schematic block diagram illustrating one embodiment of color data 200. The color data 200 may be organized as a data structure in a memory. In the depicted embodiment, the color data 200 includes a screen color 215, a target color 230, a temperature threshold 245, a gamut threshold 250, a color threshold 255, a light threshold 260, a calibration time interval 265, ambient light levels 270, and a calibration timer 275. In addition, the color data 200 may include a color difference 245. The screen color 215 may exhibit a screen color temperature 205 and a screen color gamut 210. The target color 230 may exhibit a target color temperature 220 and a target color gamut 225. The color difference 245 may include a color temperature difference 235 and a color gamut difference 240.

The color temperatures 205/220 may be based on a temperature of a black-body radiator. The color temperatures 205/220 may be expressed in Kelvin. The color gamuts 210/225 may represent colors that can be accurately represented.

The screen color 215 may be determined from the image of the mirror 130. The target color 230 may be determined from the image of the target 135. The screen color 215 may be calibrated to match the target color 230. In one embodiment, the screen color temperature 205 may be calibrated to match the target color temperature 220. In addition, the screen color gamut 210 may be calibrated to match the target color gamut 225.

The color difference 245 may be a difference between the screen color 215 and the target color 230. The color temperature difference 235 may be a difference between the screen color temperature 205 and the target color temperature 220. The color gamut difference 240 may be a difference between the screen color gamut 210 and the target color gamut 225.

The color threshold 255 may be used to determine if the screen color 215 matches the target color 230. The temperature threshold 245 may be used to determine if the screen color temperature 205 matches the target color temperature 220. The temperature threshold 245 may be in the range of 10 to 100 Kelvin. The gamut threshold 250 may be used to determine if the screen color gamut 210 matches the target color gamut 225.

The light threshold 260 may indicate a minimum change in ambient light needed to initiate recalibrating the screen color 215. The calibration time interval 265 may indicate a minimum time interval needed to initiate recalibrating the screen color 215.

The ambient light levels 270 may record a series of ambient light levels over a time interval. The ambient light levels may be recorded by the camera 105. The calibration timer 275 may indicate a time from the last calibration of the screen color 215.

Figure 4:
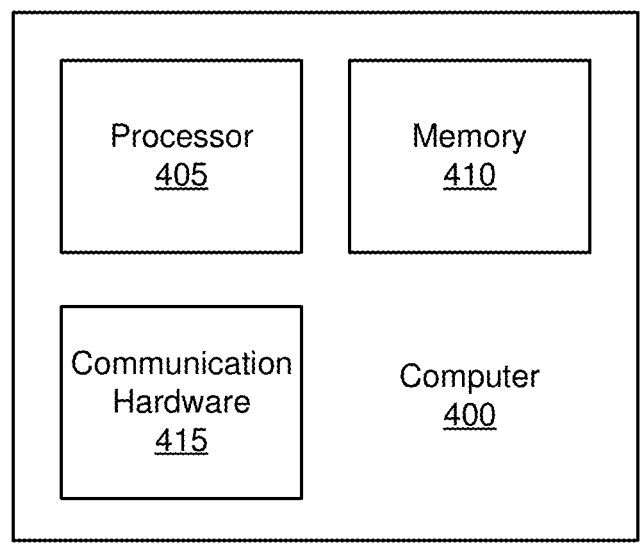
FIG. 4 is a schematic block diagram illustrating one embodiment of a computer.

FIG. 4 is a schematic block diagram illustrating one embodiment of the computer 400. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the camera 105.

Figure 5A:
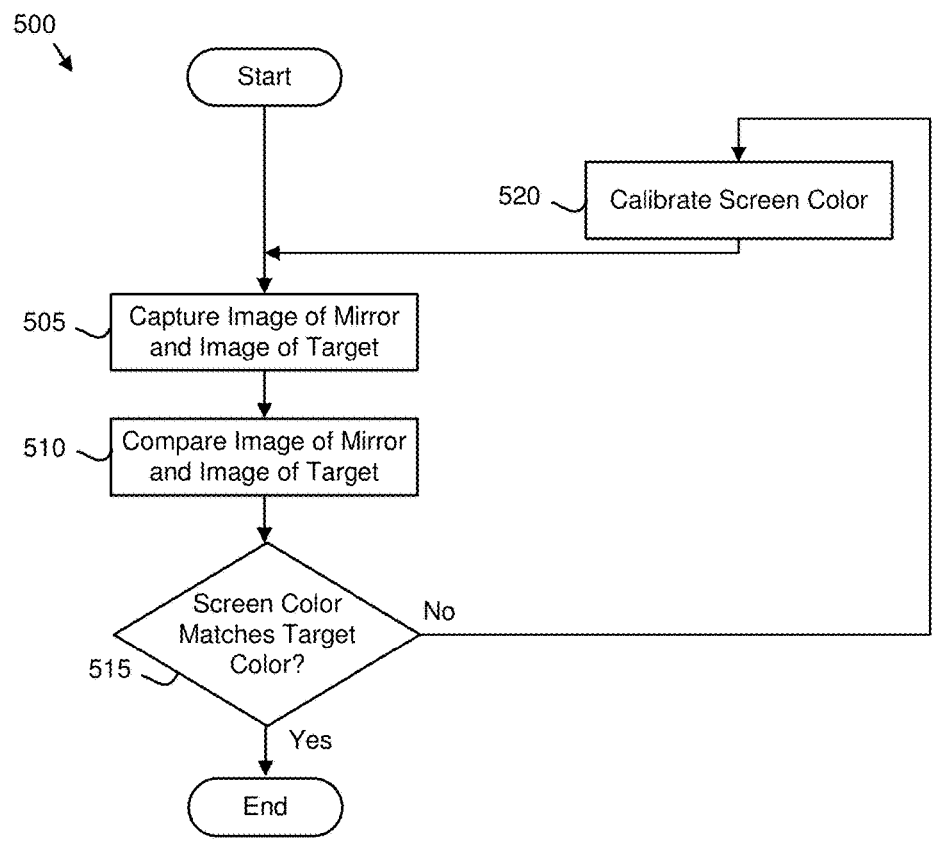
FIG. 5A is a schematic flow chart diagram illustrating one embodiment of a color calibration method.

FIG. 5A is a schematic flow chart diagram illustrating one embodiment of a color calibration method 500. The method 500 may calibrate the screen color 215 of the screen 120. The method 500 may be performed by the apparatus 100 including the camera 105 and the processor 405.

The method 500 starts, and in one embodiment, the camera 105 captures 505 the image of the mirror 130 and the image of the target 135. The image of the mirror 130 includes reflected light 195 from the screen 120. Both the mirror 110 and the target 115 are visible by the camera 105.

The processor 405 may compare 510 the image of the mirror 130 and the image of the target 135. The processor 405 may determine the screen color 215. In one embodiment, the processor 405 determines the screen color temperature 205 and the screen color gamut 210. The processor 405 may further determine the target color 230. In a certain embodiment, the processor 405 determines the target color temperature 220 and the target color gamut 225.

The processor 405 may further compare 510 the image of the mirror 130 and the image of the target 135 by calculating the color difference 245. In one embodiment, the processor 405 calculates the color temperature difference 235 and the color gamut difference 240. The color temperature difference 235 may be the difference in Kelvin between the screen color temperature 205 and the target color temperature 220. For example, the color temperature difference 235 may be 30 Kelvin.

In a certain embodiment, the processor 405 calculates the color gamut difference 240. The color gamut difference 240 may be a difference in the colors comprised in the target color gamut 225 and the colors included in the screen color gamut 210.

The processor 405 may determine 515 if the screen color 215 matches the target color 230. In one embodiment, the processor 405 determines 515 if the screen color temperature 205 matches the target color temperature 220. In addition, the processor 405 may determine 515 if the screen color gamut 210 matches the target color gamut 225.

The screen color 215 may match the target color 230 if the color temperature difference 235 is within the temperature threshold 245. For example, if the temperature threshold is 40 Kelvin and the color temperature difference 235 is 30 Kelvin, the screen color temperature 205 may match the target color temperature 220.

In addition, the screen color 215 may match the target color 230 if the color gamut difference 240 is within the gamut threshold 250. In one embodiment, the screen color 215 may match the target color 230 if both the color temperature difference 235 is within the temperature threshold 245 and the color gamut difference 240 is within the gamut threshold 250.

In a certain embodiment, the screen color 215 may match the target color 230 if Equation 1 is satisfied, where CT is the color threshold 255, TD is the color temperature difference 235, GD is the color gamut difference 240, and K1 and K2 are nonzero constants.

$$CT < \sqrt{TD/K1 + GD/K2} \qquad \text{Equation 1}$$

If the screen color 215 of the screen 110 matches the target color 230 of the target 115, the method 500 ends. If the screen color 215 does not match the target color 230, the processor 405 may calibrate 520 the screen color 215 the screen 120 to match the target 115 and/or the target color 230. The processor 405 may adjust color settings for the screen 120 to calibrate 520 the screen color 215.

The method 500 further loops to capture 505 the image of the mirror 130 in the image of the target 135, compare 510 the image of the mirror 130 in the image of the target 135, and determine 515 if the screen color 215 matches the target color 230.

Figure 5B:
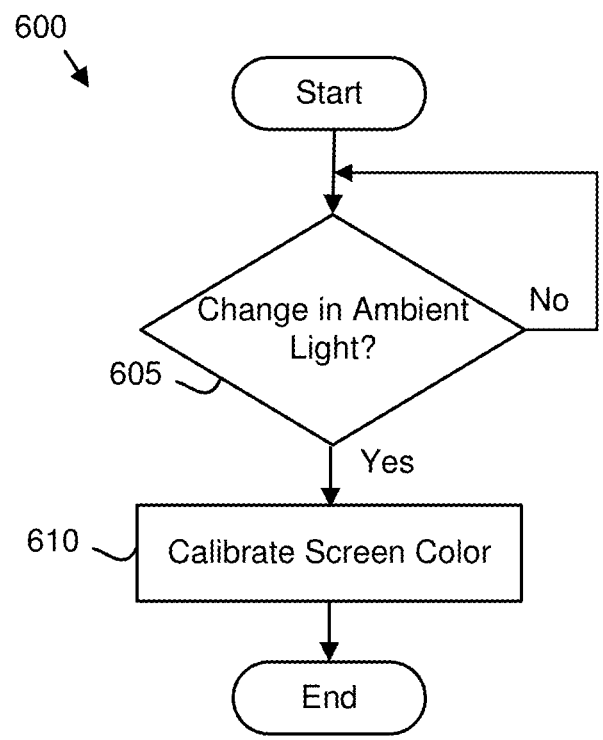
FIG. 5B is a schematic flow chart diagram illustrating one embodiment of a color calibration initiation method.

FIG. 5B is a schematic flow chart diagram illustrating one embodiment of a color calibration initiation method 600. The method 600 may determine whether to perform the color calibration method 500 of FIG. 5A. The method 600 may be performed by the camera 105 and the processor 405.

The method 600 starts, and in one embodiment, the processor 405 determines 605 if there is a change in the ambient light around the screen 120. The processor 405 may periodically record the ambient light levels 270 from the camera 105 to the ambient light levels 270. If the change in the ambient light levels 270 over the time interval exceeds the light threshold 260, the processor 405 may determine 605 there is a change in the ambient light.

If there is no change in the ambient light, the processor 405 continues to determine 605 if there is a change in the ambient light. If there is a change in the ambient light, the processor 405 may calibrate 610 the screen color 215 and the method 600 ends. In one embodiment, the processor 405 calibrates 610 the screen color 215 during a period of inactivity such as when no user inputs are received by the computer 400.

Figure 5C:
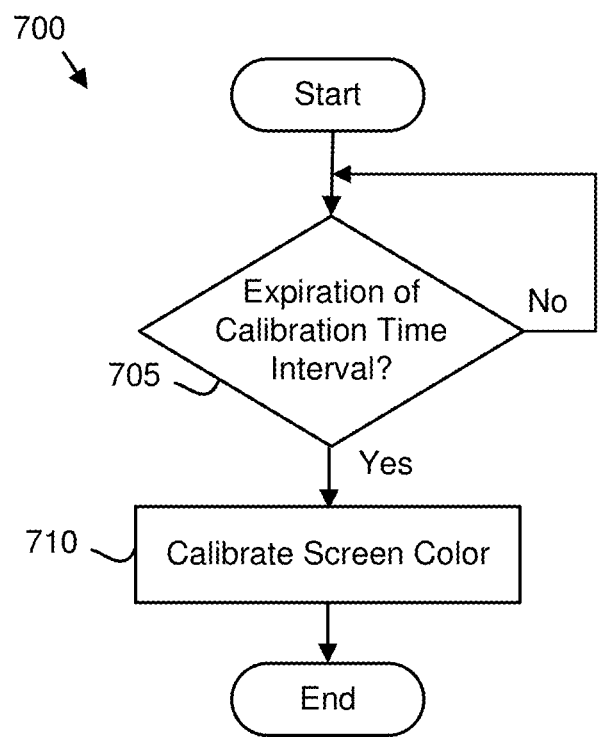
FIG. 5C is a schematic flow chart diagram illustrating one alternative embodiment of a color calibration initiation method.

FIG. 5C is a schematic flow chart diagram illustrating one alternative embodiment of a color calibration initiation method 700. The method 700 may determine whether to perform the color calibration method 500 of FIG. 5A. The method 700 may be performed by the processor 405.

The method 700 starts, and in one embodiment, the processor 405 determines 705 if the calibration time interval 265 is expired. The calibration time interval 265 may be expired if the calibration timer 275 exceeds the calibration time interval 265. If the calibration time interval 265 is not expired, the processor 405 continues to determine 705 if the calibration time interval 265 is expired. If the calibration time interval 265 is expired, the processor 405 may calibrate 710 the screen color 215 and the method 700 ends. The processor 405 may calibrate 710 the screen color 215 using the color calibration method 500 of FIG. 5A. In one embodiment, the processor 405 calibrates 710 the screen color 215 during a period of inactivity such as when no user inputs are received by the computer 400.

The embodiments compare the image of the mirror 130 and the image of the target 135 captured by the camera 105 and modify the screen color 215 of the screen 120 to match the target 115, calibrating the screen color 215 of the screen 120. As a result, the screen color 215 may be continually calibrated to display the desired colors.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a camera disposed in a bezel of a computer;
   a mirror that reflects light from a screen of the computer to the camera;
   a target that is visible by the camera;
   a processor;
   a memory that stores code executable by the processor to:
   detect an expiration of a calibration time interval that indicates a minimum time interval for initiating calibration;
   in response to detecting the expiration of the calibration time interval, compare an image of the mirror and an image of the target captured by the camera; and
   calibrate a screen color of the screen to match the target.

2. The apparatus of claim 1, wherein the screen color exhibits a screen color temperature and a screen color gamut.

3. The apparatus of claim 1, wherein the target exhibits a target color temperature and a target color gamut.

4. The apparatus of claim 1, wherein the target and the mirror are disposed in one of a base of the computer, the bezel, and beside the screen.

5. The apparatus of claim 1, wherein the code is further executable by the processor to:
   detect a change in ambient light; and
   in response to detecting the change in ambient light, calibrate the screen color.

6. The apparatus of claim 1, wherein an angle between the image of the mirror and the image of the target is within an angular threshold in the range of 5 to 15 degrees.

7. A method comprising:
   detecting, by use of a processor, an expiration of a calibration time interval that indicates a minimum time interval for initiating calibration;
   in response to detecting the expiration of the calibration time interval, comparing an image of a mirror and an image of a target captured by a camera, wherein the mirror reflects light from a screen of a computer to the camera, and the target that is visible by the camera; and
   calibrating a screen color of the screen to match the target.

8. The method of claim 7, wherein the screen color exhibits a screen color temperature and a screen color gamut.

9. The method of claim 7, wherein the target exhibits a target color temperature and a target color gamut.

10. The method of claim 7, wherein the target and the mirror are disposed in one of a base of the computer, the bezel, and beside the screen.

11. The method of claim 7, the method further comprising:
detecting a change in ambient light; and
in response to detecting the change in ambient light, calibrating the screen color.

12. The method of claim 7, wherein an angle between the image of the mirror and the image of the target is within an angular threshold in the range of 5 to 15 degrees.

13. A program product comprising a computer readable storage medium that stores code executable by a processor, the executable code comprising code to:
detect an expiration of a calibration time interval that indicates a minimum time interval for initiating calibration;
in response to detecting the expiration of the calibration time interval, compare an image of a mirror and an image of a target captured by a camera, wherein the camera is disposed in a bezel of a computer, the mirror reflects light from a screen of the computer to the camera, and the target that is visible by the camera; and
calibrate a screen color of the screen to match the target.

14. The program product of claim 13, wherein the screen color exhibits a screen color temperature and a screen color gamut.

15. The program product of claim 13, wherein the target exhibits a target color temperature and a target color gamut.

16. The program product of claim 13, wherein the target and the mirror are disposed in one of a base of the computer, the bezel, and beside the screen.

17. The program product of claim 13, wherein the code further:
detects a change in ambient light;
in response to detecting the change in ambient light, calibrates the screen color.

* * * * *